United States Patent [19]
Dobos et al.

[11] 4,274,597
[45] Jun. 23, 1981

[54] WATERING HEAD

[75] Inventors: Alajos Dobos; Gyula Kiss; Julia Jony nee Acs; Laszlo Sasdi; Vilma Bisits nee Zsilinszky, all of Budapest, Hungary

[73] Assignee: Agrober Mezögazdasagi es Elelmiszeripari Tervezö, Beruhazasivallalat, Budapest, Hungary

[21] Appl. No.: 85,797

[22] Filed: Oct. 17, 1979

[30] Foreign Application Priority Data

Nov. 15, 1978 [HU] Hungary .................................. B 901

[51] Int. Cl.³ .............................................. B05B 1/02
[52] U.S. Cl. ..................................... 239/542; 138/42; 239/547
[58] Field of Search ....................... 239/542, 271, 547; 138/42, 43

[56] References Cited

U.S. PATENT DOCUMENTS

| 3,729,142 | 4/1973 | Rangel-Garza et al. | 138/42 |
| 4,106,525 | 8/1978 | Currie et al. | 138/42 |

FOREIGN PATENT DOCUMENTS

| 17722 | 5/1913 | France | 138/42 |
| 464929 | 4/1914 | France | 138/42 |
| 55970 | 1/1935 | Norway | 138/42 |

Primary Examiner—Johnny D. Cherry
Attorney, Agent, or Firm—Karl F. Ross

[57] ABSTRACT

The invention relates to a watering head for the drop feed irrigation mainly of orchards with impermeable soil. It consists of two main parts, i.e. the body connected to the watering pipeline, and the replaceable feeder unit mounted on the body. Occasionally the body and the feeder unit are constructed from one piece. The feeder unit is a prism, or body of rotation extending in the longitudinal axis, the interior of which is provided preferably with a spatial spiral polygonal braking duct reducing the flow velocity of the irrigation water. One end of the braking duct leads into the part, e.g. receiving sleeve pulled over the body—suitable for connection of the feeder unit and body to each other, while the other end is developed as a drop feed orifice for discharge of the irrigation water.

4 Claims, 8 Drawing Figures

WATERING HEAD

FIELD OF THE INVENTION

The invention relates to a watering head for the drop-feed irrigation of plants, mainly orchards with impermeable soil.

BACKGROUND OF THE INVENTION

In drop-feed irrigation the watering head is connected to the water source directly or indirectly with an irrigation pipeline laid in the vicinity of the ground surface, or is fastened to an irrigation pipeline that constitutes the part of an irrigation machine, e.g. a stationary, mobile in one place, towed or self-propelled irrigation unit. The watering head consists of two main parts, i.e. the body connected with the irrigation pipeline and the replaceable feeder unit mounted on the body. The irrigation water is delivered through the feeder unit onto the soil and/or plants at a pressure lower than 5 m, preferably 2 m $H_2O$ water column.

Drop-feed irrigation has gained general acceptance during the last decade. Its main feature is that the water is delivered practically at a continuous rate, or intermittently with short intervals to the area to be irrigated, instead of in concentrated form occasionally during the growth season.

The water supply of the soil can be properly regulated with drop-feed irrigation and it is possible to provide optimal water quantity for the growth of the vegetation. A further advantage is that it is easy to automate and its servicing hardly requires manual labor.

A characteristic type of the water feeding heads suitable for drop feed irrigation is described in the French Pat. specification No. 2,185,349. The water is discharged through large-headed nails pressed into the irrigation hose that is provided with various gaps and/or holes. This type of water feeding head did not work in the practice, because the gaps or holes got clogged, while production of the heads was difficult and consequently expensive.

The drop-feed-type of watering device is described in the French Pat. No. 2,268,460. Here too the watering heads are inserted into the pipeline and are fastened with clamps. The watering heads consist of two parts, i.e. the body connected to the pipe and the replaceable feeder unit. The latter ones are provided with water outlet orifices along the mantle surface. The heads are complicated, material-intensive, the production is difficult and the orifices are sensitive to clogging.

A drop feed type head based on different principle is described in the French Pat. No. 2,281,719. The water passes through a large diameter orifice from the main conduit into the interior of the feeding head, where it is forced to travel a long distance. In spite of its conceptually correct and technically advanced construction the feeding head is not desirable, because its construction is even more complicated than those mentioned before; production of the head is more expensive and thus its general use cannot be reckoned with.

The drop-feed water-feeding head described in the French Pat. specification No. 2,229,347 is inserted into the irrigation pipeline as a pipe connecting adapter. One end of the adapter is provided with a square thread. The shape, depth, pitch and number of the threads determines the water quantity to be delivered. The otherwise correct basic idea here too results—just as in those mentioned before—in production operation and economic disadvantages.

It is more suited for the ploughland irrigation, but functions on the drop feed principle the water feeding device described in the French Pat. No. 2,175,616. This too is provided with a thread, and the water quantity is regulatd by the extent of screwingin. The water to be discharged flows in the grooves of the thread. Here too is the construction ingenious, but extremely complicated. Consequently it is expensive for the small-scale farms, while in the large-scale farms—owing to the need of continuous adjustment of the feeder pins—it is impractical, because it requires a large amount of manual labor.

Most drop-feed water-feeding devices deliver 1.5 to 5.0 liters of water per hour. In light of this the orifices are of narrow cross section; generally the diameter is between 0.25 and 0.60 mm. Owing to the very narrow hole cross sections, the risk of clogging is prevented by subjecting the irrigation water to filtering and in certain cases to other purification treatments.

In principle the irrigation water does not require intensive purification and the irrigation with purified water becomes more expensive with the investment and operation of the additional equipment. The irrigation of an orchard of 100 hectares land area in soil of average permeability in the temperate zone requires as much water as the drinking water supply of a settlement with 10,000 inhabitants. Consequently the basic cost of producing irrigation water is of vital importance.

OBJECT OF THE INVENTION

The object of the invention is to provide a watering head which permits the economic water supply to the various plants mainly orchards by the drop feed method.

It is also an object to deliver the water to the soil and/or vegetation at a low pressure, generally lower than 2 m water column pressure and through holes of generally large diameter.

Still another object is to provide a watering head which permits drop feed irrigation through outlet orifices of about 1.5 mm, or larger diameter, so that the mechanical fine filtering and/or incidental chemical purifications, erection of filtering stations, alga-filtering, etc. should be dispensed without the risk of clogging.

SUMMARY OF THE INVENTION

The invention idea is based on the recognition that watering heads provided with large diameter holes eliminating the risk of clogging will be suitable for the delivery of the required specific quantity of water with drop feed method only if the flow velocity of the water is considerably reduced. Reduction of the flow velocity is suitably realized with the aid of a duct system of particular construction which brakes the water flow under pressure to such extent, that it passes through the outlet orifice drop by drop, or possibly as a jet of low velocity.

In accordance with the set objective the watering head according to the invention—which watering head is connected to the water source directly or indirectly with established irrigation pipeline laid in the vicinity of the ground surface, or fastened to an irrigation pipeline that constitutes the part of an irrigation machine, thus a stationary, mobile in one place, towed, or self-propelled irrigation plant and consists of two main parts, i.e. the body connected to the irrigation pipeline and the replaceable feeder unit mounted on the body, while the irrigation water is delivered through the feeder unit to the soil and/or plants at a pressure lower than 5 m, preferably 2 m water colum—is constructed for drop feed irrigation mainly of orchards with impermeable soil in such a way that the feeder unit is a prism or body of rotation, e.g. cylinder extending in the longitudinal axis of the feeder unit, the interior of which is provided preferably with a spatial, spiral polygon shaped braking duct, reducing the flow velocity of the irrigation water, one end of the braking duct leads into the receiving sleeve pulled over the body, suitable for connection of the feeder unit and body to each other, while the other end is formed as a drop-feed orifice for outlet of the irrigation water.

A further criterion of the watering head according to the invention is that at least a certain part of the braking duct's corner points is situated along an imaginary spiral coaxial with the longitudinal axis of the feeder unit. The spiral thread of the braking duct is of continuous or intermittent pitch, while the angle of spiral thread or pitch sections in relation to the longitudinal axis of the feeder unit is preferably constant.

The feeder unit contains a solid internal core, the braking ducts are formed in the internal core, while the sleeve constituting the outer mantle of the feeder unit in given case is pulled over the internal core.

In one embodiment the threads of the braking duct are connected with each other through additional holes in given case parallel with the longitudinal axis of the feeder unit. At another embodiment the threads of the braking duct are preferably polygonal rings returning into themselves, which are connected with each other through additional holes, in given case parallel with the longitudinal axis of the feeder unit.

The most important of the several advantages of the watering head according to the invention is that in case of 1.5 and 5.0 liters per hour water discharge rate it permits about 10-times as much outlet cross section in relation to the usual drop feed watering heads—i.e. the application of such large size 1.5 mm or over orifices, holes, whereby the so-called fine filtering is unnecessary.

This way the investment and operating costs of the filter station can be saved, since only the so-called safety-filtering is needed suitable for keeping out the coarse impurities. Besides the absence of filtering or its being simplified, the application of low operating pressure is also an advantage, since low capacity pumps and less expensive, simpler water conducting pipe network will be necessary.

SPECIFIC DESCRIPTION

Figure 1:
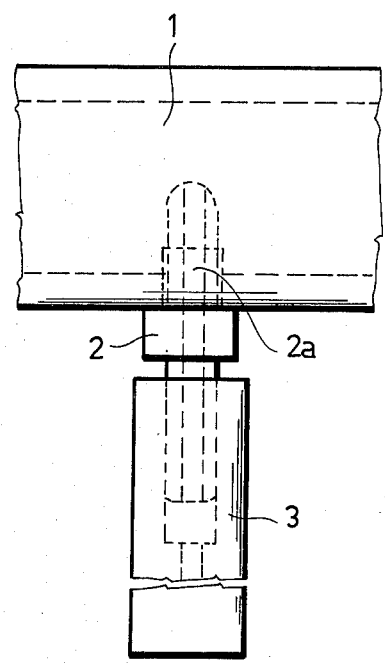
FIG. 1 is an elevational view which illustrates the arrangement of the watering head on the irrigation pipeline.

FIG. 1 shows the irrigation pipeline 1 laid on the ground or in the vicinity of the ground surface, where the watering head consists of the body 2 and the feeder unit 3, and it is built into the hole on the mantle surface. The construction is entirely similar even when the irrigation pipeline 1 is part of a stationary, mobile in one place, towed or self-propelled irrigation plant.

Figure 2:
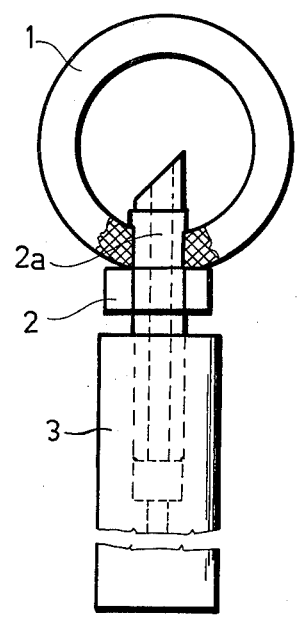
FIG. 2 is a section along plane II—II marked in FIG. 1.

FIG. 2 shows that the body 2 of the watering head is inserted into the irrigation pipeline 1 along its lower generatrix. However in principle it has no significance whether the watering head takes up the shown vertical position, or it is situated in any other direction—either at an angle or horizontally. In any case the irrigation water emerges from the watering head by drop feed, and it is indifferent that the water drops will pass onto the soil and/or individual plants with a possible deviation of a few centimeters.

Figure 3:
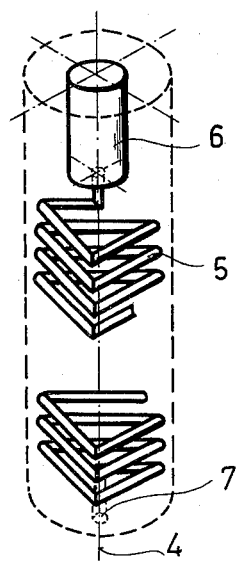
FIGS. 3 and 4 are axonometric views of the watering head with trilateral polygonal braking duct.
Figure 4:
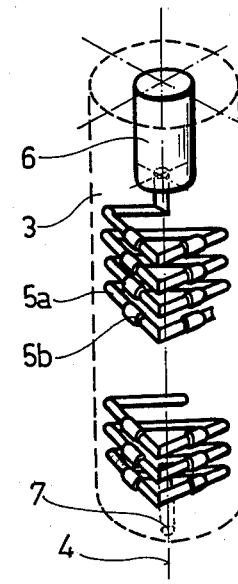

FIGS. 3 and 4 illustrate such feeder unit—in a much larger scale than in FIGS. 1 and 2—in the interior of which a spatial polygonal helix braking duct 5 is developed. The polygon of the braking duct 5 in this case is a triangle, advisably it shows an equilateral triangle as seen in the direction of the longitudinal axis 4 of the feeder unit 3.

The braking duct 5 starts out from the receiving sleeve 6 and ends in the drop feed orifice 7. The receiving sleeve 6 is a hole suitably of circular cross section, with the aid of which the feeder unit 3 can be inserted into the body 2 fixed in the irrigation pipeline 1. Naturally the body 2 is provided with such longitudinal hole 2a through which the water emerging from the interior of the irrigation pipeline 1 passes into the feeder unit 3.

FIG. 4 shows an alternative to the trilateral polygonal braking duct 5 where a braking chamber 5b is placed between the corner points 5a of each polygonal side. The braking chambers 5b are the expanding parts of the braking duct 5, in which the water passing through is forced to further velocity reduction. Naturally more than one braking chamber 5b can be developed along each polygon side.

Figure 5:
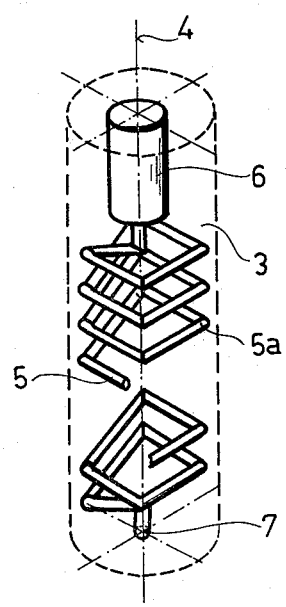
FIGS. 5 and 6 are axonometric views of the watering head with quadrilateral polygonal braking duct.
Figure 6:
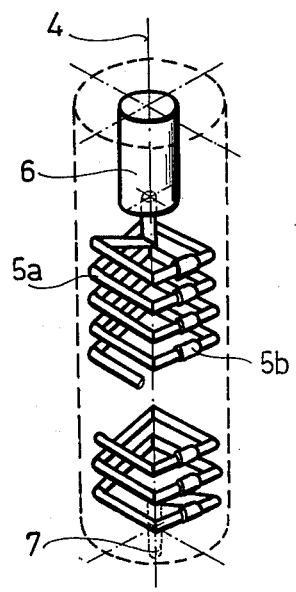

In FIGS. 5 and 6, the braking duct 5 is formed by a quadrilateral spatial spiral polygon. In FIG. 5 the polygon sides do not have braking chambers, while in FIG. 6 one of the four polygon sides along each "thread" is provided with a braking chamber 5b too.

Figure 7:
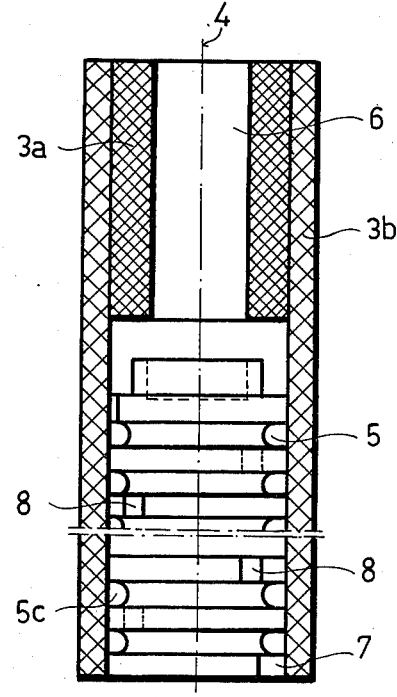
FIG. 7 is a cross-sectional view of the watering head with annular braking ducts.

FIG. 7 shows such feeder unit 3 in which the braking ducts 5 are developed in the form of separate rings 5c. Their planes are perpendicular to the longitudinal axis 4 of the feeder unit 3. The separate rings 5c are connected with each other through the additional holes 8.

Figure 8:
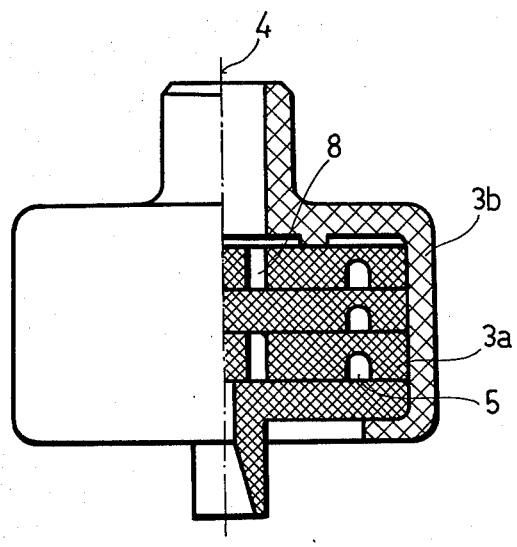
FIG. 8 shows a feeder unit in which the solid internal core can be assembled from several pieces.

FIG. 8 illustrates such feeder unit in which the solid internal core 3a can be assembled preferably from several pieces. The braking ducts in the internal core 3a are connected by additional holes 8 parallel with the longitudinal axis 4 of the feeder unit 3.

According to the experience it suits the purpose if the additional holes are in a staggered arrangement along a different generatrix of the cylindrical feeder unit 3, in such a way that the water passing through one of the additional holes 8 is forced to travel the possibly longest distance along the ring 5c and only afterwards should pass into the additional hole 8 leading to the next ring 5c.

It is not absolutely necessary that in case of the embodiments shown in FIGS. 3 and 6 the polygon sides arranged on each side should be parallel with each other. It is not necessary either that every one of the corner points 5a should be arranged along the thread, or that the pitch of the spiral polygon should be constant. The axes of the additional holes shown in FIGS. 7 and 8 need not to be parallel with the longitudinal axis 4 of the feeder unit 3.

It may be to the purpose in the case of any embodiment, if the feeder unit 3 contains such internal core 3a, which can be provided with the braking ducts 5. The internal core 3a can be pushed into the sleeve 3b only after the completion of the braking ducts 5, and thus the sleeve forms the external mantle of the feeder unit 3. This is demonstrated by an example in FIG. 7. The braking ducts 5 in the interior of the internal core 3a may be arranged arbitrarily in any direction. The possibility exists for the braking ducts 5 to be sunk into the mantle surface of the internal core 3a and thus the braking ducts 5 become from grooves to actual braking ducts only afterwards, when the sleeve 3b has already been pulled over the internal core 3a.

If the irrigation pipeline 1 is laid directly on the ground, it may result in clogging of the drop feed orifices 7 with soil particles. In this case they are removed very simply—with the use of so-called flushing pressure. Generally it is advisable to suspend the irrigation pipeline 1 on some kind of supporting structure in a position higher than the ground, e.g. on carrier cable, while the watering heads are arranged vertically along the lower generatrix of the irrigation pipeline 1.

The watering head according to the invention can be used equally in orchards and for field crops. The best experiences were acquired in impermeable soils, where relatively extensive lateral seepage can be reckoned with. If the irrigation is not required for orchard, then good results can be obtained in case of any soil type.

What we claim is:

1. A drop-feed irrigating head adapted to be connected to a pipe, comprising:
   a tubular fitting penetrating said pipe and affixed thereto;
   a cylindrical housing connected to said fitting and having a free end spaced from said pipe;
   a receiving sleeve in said housing communicating with said fitting for receiving water through said fitting from said pipe; and
   a braking duct connected at one extremity to said sleeve and disposed in said housing while terminating at said end of said housing in a water-discharge orifice, said duct having a polygonal helical configuration of a plurality of turns with each turn consisting of a plurality of straight branches successively connected to one another at angular vertices lying along a helix within said housing.

2. The head defined in claim 1 wherein each turn has three branches.

3. The head defined in claim 1 wherein each turn has four branches.

4. The head defined in claim 1, claim 2 or claim 3 wherein at least some of said branches are formed between respective vertices with flow-velocity-reducing chambers.

* * * * *